(12) United States Patent
Dev et al.

(10) Patent No.: US 11,919,530 B2
(45) Date of Patent: Mar. 5, 2024

(54) METHOD AND SYSTEM FOR VALIDATING AN AUTONOMOUS VEHICLE STACK

(71) Applicants: Wipro Limited, Bangalore (IN); Indian Institute of Science, Bangalore (IN)

(72) Inventors: Yuvika Dev, Bangalore (IN); Suresh Sundaram, Bangalore (IN)

(73) Assignees: Wipro Limited, Bangalore (IN); Indian Institute of Science, Bangalore (IN)

(*) Notice: Subject to any disclaimer, the term of this patent is extended or adjusted under 35 U.S.C. 154(b) by 267 days.

(21) Appl. No.: 17/391,328

(22) Filed: Aug. 2, 2021

(65) Prior Publication Data

US 2022/0185302 A1 Jun. 16, 2022

(30) Foreign Application Priority Data

Dec. 15, 2020 (IN) .............................. 202041054541

(51) Int. Cl.
*B60W 50/00* (2006.01)
*B60W 50/06* (2006.01)
(Continued)

(52) U.S. Cl.
CPC .......... *B60W 50/06* (2013.01); *B60W 60/001* (2020.02); *G07C 5/085* (2013.01);
(Continued)

(58) Field of Classification Search
CPC .............. B60W 50/06; B60W 60/001; B60W 2050/0028; B60W 2420/54;
(Continued)

(56) References Cited

U.S. PATENT DOCUMENTS

2018/0075309 A1* 3/2018 Sathyanarayana ... G05D 1/0055
2019/0163185 A1* 5/2019 Bin-Nun ................ G07C 5/085
(Continued)

FOREIGN PATENT DOCUMENTS

CN 111098863 A * 5/2020 ............ B60W 50/00
WO 2020079685 A1 4/2020

OTHER PUBLICATIONS

Zhang et al., Research on Construction Method and Application of Autonomous Driving Test Scenario Database, CICTP 2020: Advanced Transportation Technologies and Development-Enhancing Connections: 311-323. (Aug. 2020) (Year: 2020).*

*Primary Examiner* — Elaine Gort
*Assistant Examiner* — Chanmin Park
(74) *Attorney, Agent, or Firm* — Finnegan, Henderson, Farabow, Garrett & Dunner LLP

(57) ABSTRACT

This disclosure relates to method and system for validating an Autonomous Vehicle (AV) stack. The method may include receiving an Operational Design Domain (ODD) and real-world data for evaluating at least one of an Advanced Driver Assistance System (ADAS) and the AV. The ODD is based on at least one feature of at least one of the ADAS and the AV. For each of a plurality of iterations, the method may further include generating a driving scenario based on the ODD of the AV and the real-world data through a Quality of Ride Experience (QoRE)-aware cognitive engine, plugging and running at least one of the ADAS and the AV algorithm based on the driving scenario, and determining a set of performance metrics corresponding to the at least one feature of at least one of the ADAS and the AV in the driving scenario based on the simulating.

20 Claims, 14 Drawing Sheets

(51) Int. Cl.
*B60W 60/00* (2020.01)
*G07C 5/08* (2006.01)
(52) U.S. Cl.
CPC . *B60W 2050/0028* (2013.01); *B60W 2420/54* (2013.01); *B60W 2510/06* (2013.01); *B60W 2510/10* (2013.01); *B60W 2510/22* (2013.01); *B60W 2520/10* (2013.01); *B60W 2520/12* (2013.01); *B60W 2530/20* (2013.01); *B60W 2552/00* (2020.02); *B60W 2554/20* (2020.02); *B60W 2554/4042* (2020.02); *B60W 2554/4043* (2020.02); *B60W 2554/406* (2020.02); *B60W 2555/60* (2020.02)
(58) Field of Classification Search
CPC ......... B60W 2510/06; B60W 2510/10; B60W 2510/22; B60W 2520/10; B60W 2520/12; B60W 2530/20; B60W 2552/00; B60W 2554/20; B60W 2554/4042; B60W 2554/4043; B60W 2554/406; B60W 2555/60; G07C 5/085
See application file for complete search history.

(56) References Cited

U.S. PATENT DOCUMENTS

| | | | |
|---|---|---|---|
| 2021/0073584 A1* | 3/2021 | St. Romain, II | G06N 5/04 |
| 2022/0009500 A1* | 1/2022 | Martin Leung | G06T 5/50 |
| 2022/0236063 A1* | 7/2022 | Mita | G01S 19/11 |
| 2022/0269279 A1* | 8/2022 | Redford | G05D 1/0044 |

* cited by examiner

METHOD AND SYSTEM FOR VALIDATING AN AUTONOMOUS VEHICLE STACK

TECHNICAL FIELD

This disclosure relates generally to Autonomous Vehicles (AVs), and more particularly, to the system and method for validating an AV stack.

BACKGROUND

Autonomous Vehicles (AVs) are an epitome of technological excellence, capable of sensing the environment and navigating autonomously without any human intervention. However, most advanced AVs are able to perform well only in a limited set of environmental conditions and weather and are not able to cope in most challenging situations due to the absence of training required for such scenarios. Even a lot of autonomous miles driven by fleets of AVs are not meaningful miles as they are unable to capture adequate variations and complexities of the environment, traffic conditions, and driving behaviors.

The conventional techniques do not discuss the level of learning required by the algorithms or aspect of complexity controllability and repeatability by trying things over in a controlled manner. Further, due to high cost, more setup time, scope (limited to system-level testing), and scalability with a close track testing and public road testing, simulation testing is generally the first step in a testing and validation pipeline to get good coverage. The availability of high-fidelity photorealistic data is another known challenge in simulation testing.

Therefore, there is a need in the present state-of-the-art for a simulator to generate training data and validate the AI Stack of the AV against various driving strategies through computer-generated normal and hedge scenarios (including dangerous scenarios) with an ease.

SUMMARY

In one embodiment, a method for validating an Autonomous Vehicle (AV) stack is disclosed. In one example, the method may include receiving an Operational Design Domain (ODD) and real-world data for simulating at least one of an Advanced Driver Assistance System (ADAS) and the AV. The ODD is based on at least one feature of the at least one of the ADAS and the AV. For each of a plurality of iterations, the method may further include generating a driving scenario based on the ODD of the AV and the real-world data through a Quality of Ride Experience (QoRE)-aware cognitive engine. The driving scenario includes a level of complexity. For each of a plurality of iterations, the method may further include simulating the at least one of the ADAS and the AV based on the driving scenario. For each of a plurality of iterations, the method may further include determining a set of performance metrics corresponding to the at least one feature of the at least one of the ADAS and the AV in the driving scenario based on the simulating.

In one embodiment, a system for validating an AV stack is disclosed. In one example, the system may include a processor and a computer-readable medium communicatively coupled to the processor. The computer-readable medium may store processor-executable instructions, which, on execution, may cause the processor to receive an ODD and real-world data for simulating at least one of an ADAS and the AV. The ODD is based on at least one feature of at least one of the ADAS and the AV. For each of a plurality of iterations, the processor-executable instructions, on execution, may further cause the processor to generate a driving scenario based on the ODD of the AV and the real-world data through a QoRE-aware cognitive engine. The driving scenario includes a level of complexity. For each of a plurality of iterations, the processor-executable instructions, on execution, may further cause the processor to simulate at least one of the ADAS and the AV based on the driving scenario. For each of a plurality of iterations, the processor-executable instructions, on execution, may further cause the processor to determine a set of performance metrics corresponding to the at least one feature of at least one of the ADAS and the AV in the driving scenario based on the simulating.

In one embodiment, a non-transitory computer-readable medium storing computer-executable instructions for validating an AV stack is disclosed. In one example, the stored instructions, when executed by a processor, may cause the processor to perform operations including receiving an ODD and real-world data for simulating at least one of an ADAS and the AV. The ODD is based on at least one feature of at least one of the ADAS and the AV. For each of a plurality of iterations, the operations may further include generating a driving scenario based on the ODD of the AV and the real-world data through a QoRE-aware cognitive engine, wherein the driving scenario comprises a level of complexity. For each of a plurality of iterations, the operations may further include simulating at least one of the ADAS and the AV based on the driving scenario. For each of a plurality of iterations, the operations may further include determining a set of performance metrics corresponding to the at least one feature of at least one of the ADAS and the AV in the driving scenario based on the simulating.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
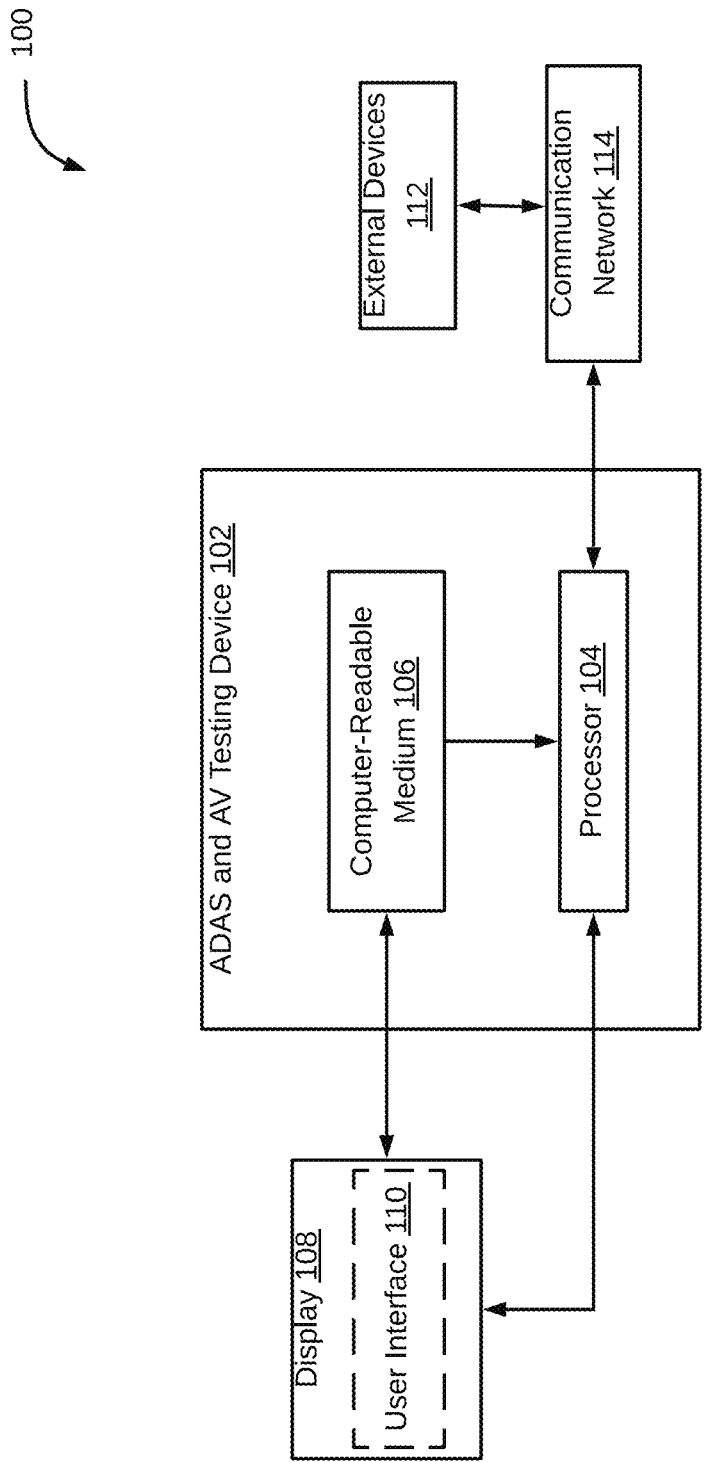
FIG. 1 is a block diagram of an exemplary system for validating an Autonomous Vehicle (AV) stack, in accordance with some embodiments.

Referring now to FIG. 1, an exemplary system 100 for validating an Autonomous Vehicle (AV) stack is illustrated, in accordance with some embodiments. The system 100 may implement in an Advanced Driver Assistance System (ADAS) and AV testing engine, in accordance with some embodiments. The ADAS and AV testing engine may validate an AV stack by generating a driving scenario through a Quality of Ride Experience (QoRE)-aware cognitive engine. The AV stack may be a part of at least one of the ADAS and the AV. In particular, the system 100 may include an ADAS and AV testing device 102 (for example, server, desktop, laptop, notebook, netbook, tablet, smartphone, mobile phone, or any other computing device) that may implement the ADAS and AV testing engine. It should be noted that, in some embodiments, the ADAS and AV testing engine may simulate at least one of the ADAS and the AV based on the driving scenario. The ADAS and AV testing engine may further determine a set of performance metrics corresponding to at least one feature of at least one of the ADAS and the AV in the driving scenario based on the simulating.

As will be described in greater detail in conjunction with FIGS. 2-13, the ADAS and AV testing device may receive an Operational Design Domain (ODD) and real-world data for simulating at least one of an ADAS and the AV. It may be noted that the ODD may be based on at least one feature of at least one of the ADAS and the AV. For each of a plurality of iterations, the ADAS and AV testing device may further generate a driving scenario based on the ODD of the AV and the real-world data through a QoRE-aware cognitive engine. It may be noted that the driving scenario may include a level of complexity. For each of a plurality of iterations, the ADAS and AV testing device may further simulate at least one of the ADAS and the AV based on the driving scenario.

For each of a plurality of iterations, the ADAS and AV testing device may further determine a set of performance metrics corresponding to the at least one feature of at least one of the ADAS and the AV in the driving scenario based on the simulating.

In some embodiments, the ADAS and AV testing device 102 may include one or more processors 104 and a computer-readable medium 106 (for example, a memory). The computer-readable medium 106 may include QoRE-aware cognitive engine which may generate an output (e.g. a driving scenario or virtual environment data) for an input data (e.g. Operational Design Domain (ODD), real-world data, etc.). Further, the computer-readable storage medium 106 may store instructions that, when executed by the one or more processors 104, cause the one or more processors 104 to validate at least one feature of at least one of the ADAS and the AV based on a set of performance metrics corresponding to the at least one feature, in accordance with aspects of the present disclosure. The computer-readable storage medium 106 may also store various data (for example, real-world data, ODD, driving scenarios, virtual environment data, set of performance metrics, evaluation reports, and the like) that may be captured, processed, and/or required by the system 100.

The system 100 may further include a display 108. The system 100 may interact with a user via a user interface 110 accessible via the display 108. The system 100 may also include one or more external devices 112. In some embodiments, the ADAS and AV testing device 102 may interact with the one or more external devices 112 over a communication network 114 for sending or receiving various data. The external devices 112 may include, but may not be limited to, a remote server, a digital device, or another computing system.

Figure 2:
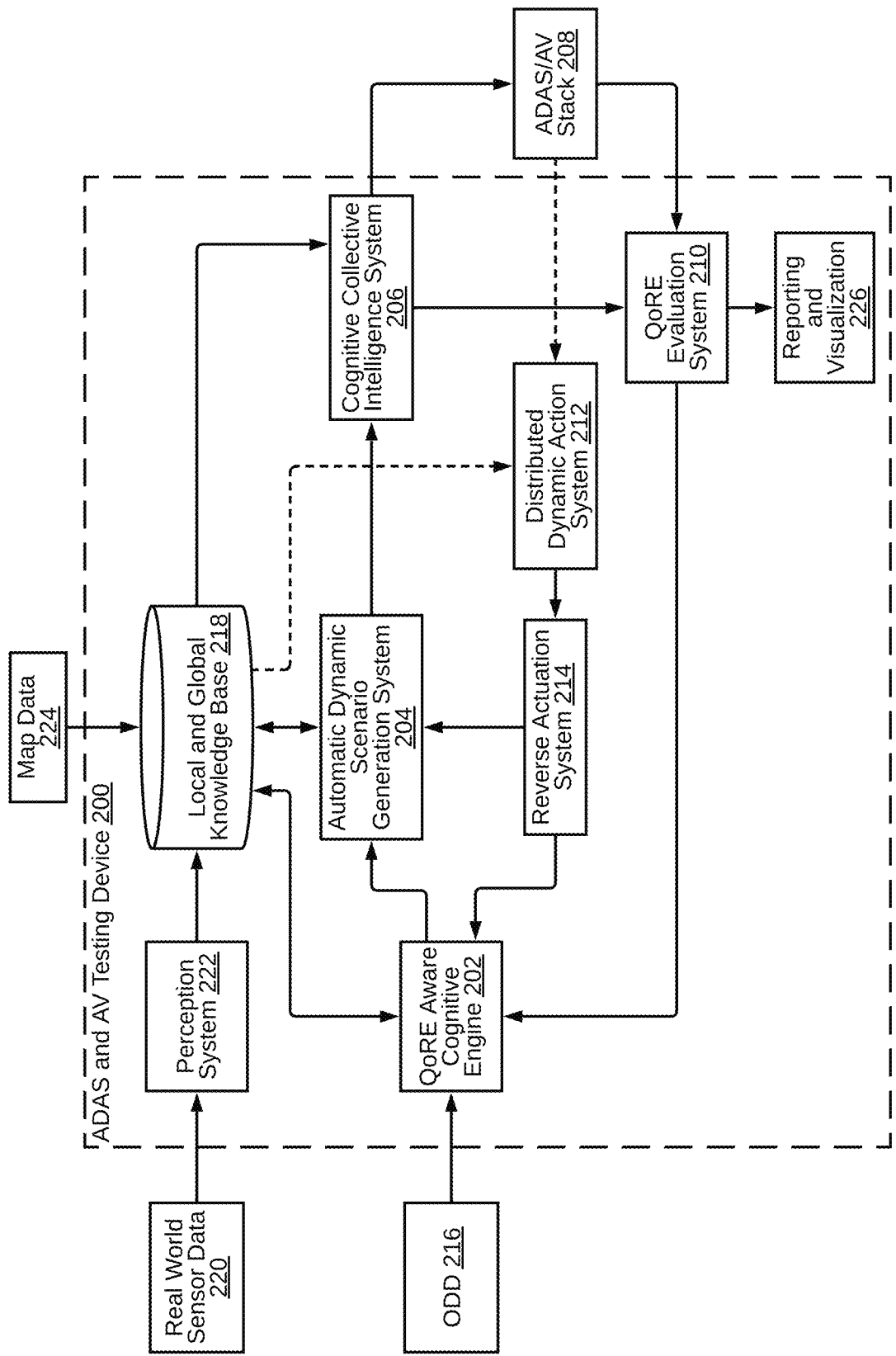
FIG. 2 is a functional block diagram of an Advanced Driver Assistance System (ADAS) and AV testing device implemented by the exemplary system of FIG. 1, in accordance with some embodiments.

Referring now to FIG. 2, a functional block diagram of an ADAS and AV testing device 200 (analogous to the ADAS and AV testing device 102 implemented by the system 100) is illustrated, in accordance with some embodiments. The ADAS and AV testing device 200 may include a QoRE-aware cognitive engine 202, an automatic dynamic scenario generation system 204, a cognitive collective intelligence system 206, a QoRE evaluation system 210, a distributed dynamic action system 212, a reverse actuation system 214, a local and global knowledge base 218, a perception system 222, and reporting and visualization 226. It may be noted that the ADAS and AV testing device 200 validates an ADAS/AV stack 208. The ADAS/AV stack 208 may be implemented within at least one of the ADAS and the AV.

The QoRE-aware cognitive engine 202 may receive an ODD 216 based on at least one feature of at least one of the ADAS and the AV. It may be noted that the QoRE-aware cognitive engine 202 is a decision agent that may analyze information and knowledge from a plurality of sources to determine a viable decision. The QoRE-aware cognitive engine 202 is a self-learning system and gradually improves the overall performance and fidelity of the simulation system. Further, the QoRE-aware cognitive engine 202 may receive real-world data from the local and global knowledge base 218. By way of an example, the real-world data may include real-world sensor data 220 (received via the perception system 222), map data 224, scenario description, satellite data, vehicle (3-dimensional or dynamic model), physical environment, and the like. It may be noted that the perception system 222 may extract real world sensor data 220 (for example, location, position, depth, velocity acceleration, orientation etc.) from a plurality of sensors attached to a plurality of AVs in a real world scenario.

Further, the QoRE-aware cognitive engine 202 may determine a driving scenario to be generated for the ADAS/AV stack 208 based on the ODD of the AV and the real-world data. It may be noted that the determined driving scenario may be a context-aware and realistic with an element of uncertainty to model real traffic behavior and characteristics. Additionally, the driving scenario includes a level of complexity. The driving scenario may include a plurality of AVs. The AV under test may be referred to as an ego vehicle. The automatic dynamic scenario generation system 204 may receive the determined driving scenario from the QoRE-aware cognitive engine 202. Further, the automatic dynamic scenario generation system 204 may generate a driving scenario based on the ODD of the AV and the real-world data. It may be noted that the automatic dynamic scenario generation system 204 may be a Computer-Generated Imagery (CGI) system. The driving scenario may be generated using pre-configured scenarios in the local and global knowledge base 218 or new scenarios using edge intelligence. To generate new scenarios using edge intelligence, the ADAS and AV testing device 200 may completely control various driving conditions and actions of other agents to create programmed and stochastic traffic with a plurality of levels of complexity.

In some embodiments, the ADAS and AV testing device 200 may generate virtual environment data automatically based on the real-world data received from the perception system 222 in real-time, manually based on a plurality of objects selected from an asset repository by a user, or a combination thereof. The asset repository may include physical infrastructure (for example, buildings, bridges, tunnels, traffic, water supply, sewers, electrical grids, telecommunications, etc.), road parameters (for example, type, surface, edges, geometry, etc.), traffic object parameters (for example, speed limit, signage, road obstacles, etc.), environment conditions (for example, weather, time of day, etc.), zones (for example, construction zone, school zone, etc.), and the like.

The virtual environment data may include a plurality of layers. The plurality of layers may include one or more of a surface information layer, a static objects information layer, a dynamic environmental information layer, and an acoustic information layer. The surface information layer may include information of road network (OpenDrive) (such as types, edges, geometry, etc.), and road surface (OpenCRG), overall road condition and curvature (to compute vehicle dynamic force), and the like. The static objects information layer may include a plurality of static objects in environment (such as, vegetation, buildings, etc.). Variations may be created in the plurality of static objects through AI within a class using various textures, materials, or props (for example, a pedestrian with a prop). Additionally, automated generation of virtual environment data may provide information related to static objects not present in the asset repository and stored in the local and global knowledge base 218.

The dynamic environmental information layer may include traffic data based on a plurality of AVs which may include density, driver dynamics, and vehicle dynamics corresponding to each of the plurality of AVs. The QoRE-aware cognitive engine 202 may generate a spatio-temporal traffic cluster based on dynamic environmental information such as driving behavior (aggressive, moderate, or conservative driver), vehicle type, density, speed, context, situation, time of day and weather, human-gesture, etc. Further, the dynamic environmental information layer may include dynamic environmental conditions such as weather (such as, rain, temperature, wind, snow, etc.), illumination, particulate matter, and road weather. In some embodiments, the weather may be further classified as heavy, medium, and light. Weather parameters (such as, cloudiness, wind, precipitation, azimuth, altitude, etc.) may be provided with the dynamic environmental information layer. By way of an example, the dynamic environmental conditions may include "light rain during noon resulting in the formation of water puddles which cause water splash when a pedestrian steps on the water puddles", "raindrops on a vehicle windshield or sensor lenses which may reduce visibility", or "heavy snow during early morning resulting in snow accumulation on vehicles and building vegetation, and a slippery road surface". The acoustic information layer may include acoustic information (for example, horn (bike or car) and siren (ambulance, fire-extinguisher, or police-cab) sound, etc.) consumed by ego vehicle (implementing the ADAS/AV stack 208). This is further discussed in detail in conjunction with FIGS. 6-13.

The QoRE evaluation system 210 monitors the quality of riding experience in the AV and evaluates the overall performance of perception and control algorithm of at least one of the ADAS and the AV or the ADAS/AV stack 208 as a whole, based on a set of performance metrics. Further, the QoRE evaluation system 210 generates an evaluation report including the set of performance metrics corresponding to the at least one feature of at least one of the ADAS and the AV after a predefined number of iterations. In an embodiment, the evaluation report may be generated after each of the plurality of iterations. It may be noted that the set of performance metrics includes distance metrics, speed metrics, AV accident metrics, perception metrics, driving quality metrics, and ride quality metrics. By way of an example, the distance metrics may include, but may not be limited to, total distance travelled. The speed metrics may include the average speed of the ego vehicle, simulation time, and the like. The AV accident metrics may include collision count, the intensity of each collision, classification of collisions into various categories based on intensity, and the like. The perception metrics may include blind-spot detection, the operational range of each sensor, minimum distance and speed maintained relative to other AVs in all directions, and the like. The driving quality metrics may include maintaining lane and traffic rules, speed near potholes and speed breakers, estimated time of arrival to a destination location, a plurality of vehicle controls, and the like. The ride quality metrics may include acceleration and brake ratio, jerk, driver riding experience, and the like. The QoRE evaluation system 210 may provide reporting and visualization 226 as outputs.

Based on the evaluation report received from the QoRE evaluation system 210, the QoRE-aware cognitive engine 202 may manage the level of complexity of the driving scenario for next iteration to improve each of the set of performance metrics of the AV stack. The QoRE-aware cognitive engine 202 may increase the level of complexity of the driving scenario when the set of performance metrics corresponding to the at least one feature of at least one of the ADAS and the AV is above a predefined threshold within a predefined number of iterations. The increasing is based on one or more of the at least one feature of at least one of the ADAS and the AV, the map location selected for the AV, the set of traffic rules corresponding to the map location, the AV, a configuration of a plurality of sensors coupled to the AV, previous driving scenarios, and the set of performance metrics for the previous driving scenarios. Further, the QoRE-aware cognitive engine 202 may maintain the level of complexity of the driving scenario when the set of performance metrics corresponding to the at least one feature of at least one of the ADAS and the AV is below a predefined threshold within a predefined number of iterations.

Further, the cognitive collective intelligence system 206 may receive the driving scenario from the automatic dynamic scenario generation system 204. Additionally, the cognitive collective intelligence system 206 may receive configurations for a plurality of sensor models corresponding to sensors associated with a plurality of interconnected AVs from the local and global knowledge base 218. The cognitive collective intelligence system 206 connects real world with the driving scenario using simulated data (such as, desired-state, sensor, and perception data) to enhance context of simulation. ADAS/AV stack 208 (perception, planning, and control algorithms) may compute a desired state and determine actuator control signals to achieve the desired state. The actuator control signals are returned to the distributed dynamic action system 212 to update a driving scene accordingly. The cognitive collective intelligence system 206 may use the plurality of sensor models to obtain simulated information. Levels for the plurality of sensor models may be ideal, stochastic, or physics-based. Vision based sensor models may include a Red Green Blue (RGB) camera (monocular or stereo), fisheye and other lens distortions to add perception error into a simulation pipeline to model a real characteristic of sensor. In some embodiments, the perception error may be introduced through variations such as sunlight or raindrops hitting sensors or camera lenses at different angles, obstacles flying in front of the ego vehicle, sensors getting blinded during sunrise or sunset, or other false negative cases, etc. Other sensor models may include ultrasonic, RADAR, LIDAR, IMU and GNSS.

Further, the validity of each of the plurality of sensor models may be checked to determine whether fidelity to real-world sensors is sufficient. In some embodiments, noise can be added at various levels to add more realism. A user may be allowed to configure various intrinsic and extrinsic parameters associated to the sensors associated with the plurality of interconnected AVs and integrate the configuration with the ego vehicle in simulation. Additionally, the plurality of sensor models may aid in generating ground-truth such as depth, semantic, collision boxes, etc. used for ADAS/AV stack 208 validation by the QoRE evaluation system 210.

Further, the distributed dynamic action system 212 may receive the actuator control signals from the ADAS/AV stack 208. The distributed dynamic action system 212 is an actuation agent which breaks hierarchical tasks into a set of sequential tasks to be performed by at least one of the ADAS and the AV based on the simulating. The distributed dynamic action system 212 may include a vehicle dynamic model. In an embodiment, distributed dynamic action system 212 may include a custom vehicle dynamics mathematical model with five interconnected bodies and 16 degrees of freedom (DOF). The custom dynamics model may include a subsystem with following features: vehicle body model, drivetrain model (engine and transmission model), suspension model, brake model, steering model, and tire model. In an embodiment, a user may be allowed to configure some of vehicle dynamics parameters such as the engine, steer, speed, brake, gear, and wheel, and other parameters. It may be noted that a high fidelity vehicle dynamic model is required during L3-L5 testing for better and more accurate control of vehicles by vehicle control module. It may also be noted that the vehicle dynamic model may consider systems, subsystems, joints, etc. that affect external and internal forces on the ego vehicle.

In some embodiments, various vehicle dynamic models are available for testing for example, 2-wheeled models (such as, a bicycle or a bike), 3-wheeled models (such as, an auto-rickshaw), 4-wheeled models (such as a car, a bus, a truck, or trailers). In some embodiments, the vehicle model may include vehicle-lights (for example, fog, head, reverse, brake, indicator, etc.) which may aid in signaling a control decision to other environmental elements (such as, vehicle, pedestrian, animals, etc.). The vehicle model may simulate movement of the wiper of the ego vehicle during snow or rain to imitate real vehicle characteristics and clear windshield for dashboard camera capturing. The distributed dynamic action system 212 may further provide hooks for plugging in a third-party vehicle model. The plurality of AVs other than the ego vehicle may further provide realistic behavior by integrating vehicle dynamics. Further, the reverse actuation system 214 may receive actions to be performed from the ADAS/AV stack 208 through the distributed dynamic action system 212. The reverse actuation system 214 may change scene dynamics based on actions of the ADAS/AV stack 208. The changed scene dynamics may be sent to the QoRE-aware cognitive engine 202 and the automatic dynamic scenario generation system 204.

It should be noted that all such aforementioned modules 202-218 may be represented as a single module or a combination of different modules. Further, as will be appreciated by those skilled in the art, each of the modules 202-218 may reside, in whole or in parts, on one device or multiple devices in communication with each other. In some embodiments, each of the modules 202-218 may be implemented as a dedicated hardware circuit comprising a custom application-specific integrated circuit (ASIC) or gate arrays, off-the-shelf semiconductors such as logic chips, transistors, or other discrete components. Each of the modules 202-218 may also be implemented in an edge device such as a field programmable gate array (FPGA), programmable array logic, programmable logic device, and so forth. Alternatively, each of the modules 202-218 may be implemented in software for execution by various types of processors (e.g., processor 104). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for validating the AV stack. For example, the exemplary system 100 and the associated ADAS and AV testing device 102, 200 may validate the AV stack by the processes discussed herein. In particular, as will be appreciated by those of ordinary skill in the art, control logic and/or automated routines for performing the techniques and steps described herein may be implemented by the system 100 and the associated ADAS and AV testing device 102, 200 either by hardware, software, or combinations of hardware and software. For example, a suitable code may be accessed and executed by one or more processors on the system 100 to perform some or all of the techniques described herein. Similarly, application specific integrated circuits (ASICs) configured to perform some or all of the processes described herein may be included in the one or more processors on the system 100.

Figure 3:
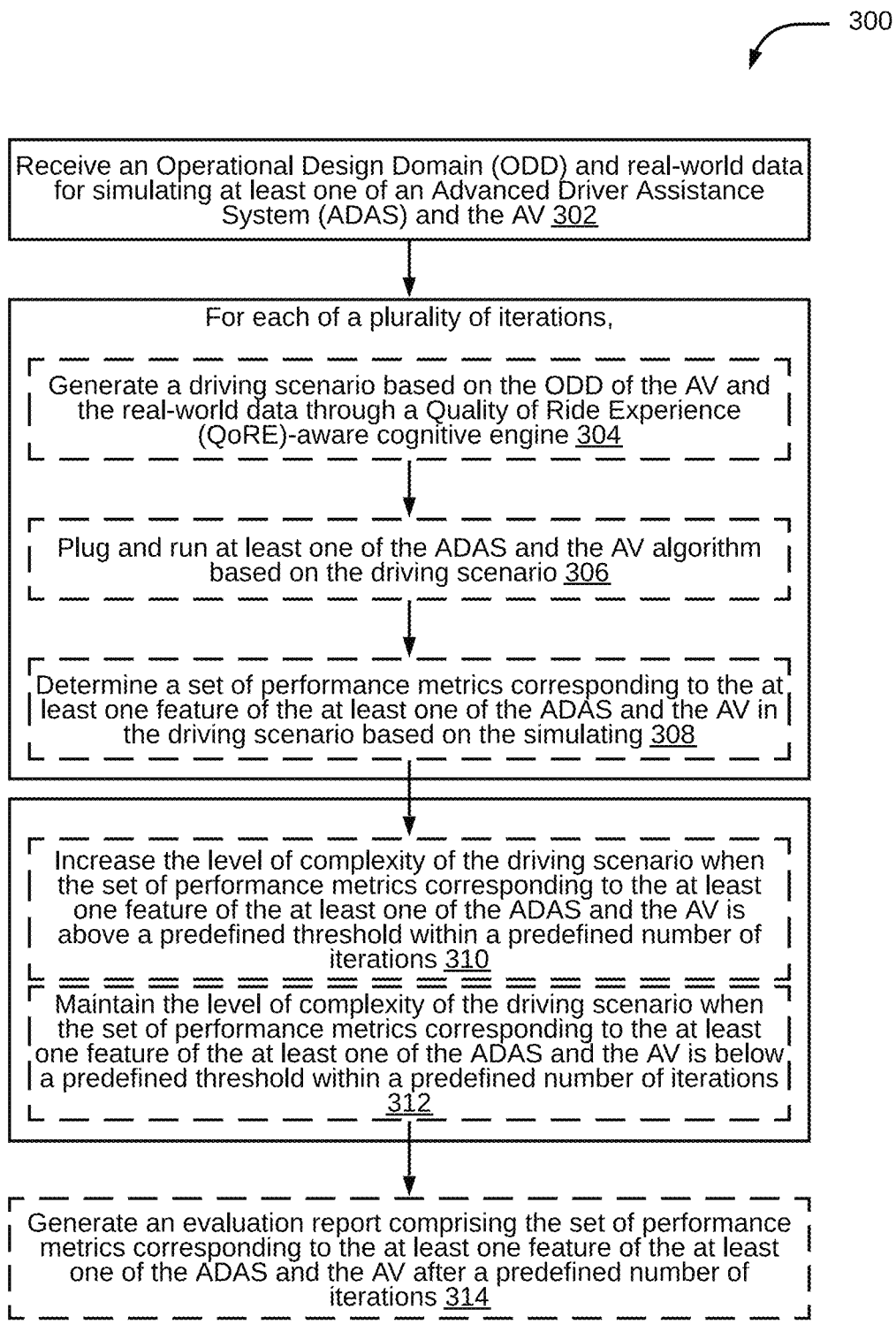
FIG. 3 illustrates a flow diagram of an exemplary process for validating an AV stack, in accordance with some embodiments.

Referring now to FIG. 3, an exemplary process 300 for validating an AV stack is depicted via a flowchart, in accordance with some embodiments of the present disclosure. In an embodiment, the process 300 may be implemented by the ADAS and AV testing device 102 of the system 100. The process 300 may include receiving an ODD (for example, the ODD 216) and real-world data (for example, the real world sensor data 220 and the map data 224) for simulating at least one of an ADAS and the AV, at step 302. The at least one of an ADAS and the AV may be analogous to the ADAS/AV stack 208. It may be noted that the ODD is based on at least one feature of at least one of the ADAS and the AV.

Further, for each of a plurality of iterations, the process 300 may include generating a driving scenario based on the ODD of the AV and the real-world data through a QoRE-aware cognitive engine (for example, the QoRE-aware cognitive engine 202), at step 304. It may be noted that the driving scenario includes a level of complexity. Further, for each of a plurality of iterations, the process 300 may include plugging and running at least one of the ADAS and the AV algorithm based on the driving scenario, at step 306. Further, for each of a plurality of iterations, the process 300 may include determining a set of performance metrics corresponding to the at least one feature of at least one of the ADAS and the AV in the driving scenario based on the simulating, at step 308. It may be noted that set of performance metrics may include distance metrics, speed metrics, AV accident metrics, perception metrics, driving quality metrics, and ride quality metrics. By way of an example, the distance metrics may include, but may not be limited to, total distance travelled. The speed metrics may include the average speed of the ego vehicle, simulation time, and the like. The AV accident metrics may include collision count, intensity of each collision, classification of collisions into various categories based on intensity, and the like. The perception metrics may include blind-spot detection, the operational range of each sensor, minimum distance and speed maintained relative to other AVs in all directions, and the like. The driving quality metrics may include maintaining lane and traffic rules, speed near potholes and speed breakers, estimated time of arrival to a destination location, a plurality of vehicle controls, and the like. The ride quality metrics may include acceleration and brake ratio, jerk, driver riding experience, and the like.

Further, the process 300 may include increasing the level of complexity of the driving scenario when the set of performance metrics corresponding to the at least one feature of at least one of the ADAS and the AV is above a predefined threshold within a predefined number of iterations, at step 310. In an embodiment, the increasing is based on one or more of the at least one feature of at least one of the ADAS and the AV, the map location selected for the AV, the set of traffic rules corresponding to the map location, the AV, a configuration of a plurality of sensors coupled to the AV, previous driving scenarios, and the set of performance metrics for the previous driving scenarios. Further, the process 300 may include maintaining the level of complexity of the driving scenario when the set of performance metrics corresponding to the at least one feature of at least one of the ADAS and the AV is below a predefined threshold within a predefined number of iterations, at step 312. It may be noted that the ADAS and AV testing device 102 may implement one of the step 310 or the step 312 for each of the plurality of iterations. Further, the process 300 may include generating an evaluation report including the set of performance metrics corresponding to the at least one feature of at least one of the ADAS and the AV after a predefined number of iterations, at step 314. In an embodiment, the evaluation report is generated after each of the plurality of iterations.

In some embodiments, the process 300 may include determining a set of sequential tasks to be performed by at least one of the ADAS and the AV based on the simulating. In such embodiments, the process 300 may further include visualizing a dynamic model of each of a plurality of AVs and an environment in the driving scenario through reverse actuation based on the set of sequential tasks. The AV is one of the plurality of AVs. By way of an example, the dynamic model of each of the plurality of AVs may include a vehicle dynamics model for each of an AV body, an AV drivetrain engine, an AV drivetrain transmission, an AV suspension model, and an AV tire model. Further, virtual environment data may be generated based on at least one of the real-world data received from a plurality of interconnected AVs in real-time, a plurality of objects selected from an asset repository by a user, or a combination thereof. The virtual environment data may include a plurality of layers. The plurality of layers includes one or more of a surface information layer, a static objects information layer, a dynamic environmental information layer, and an acoustic information layer. In an embodiment, the dynamic environmental information layer includes traffic data based on a plurality of AVs. The traffic data may include density, driver dynamics, and vehicle dynamics corresponding to each of the plurality of AVs.

Figure 4:
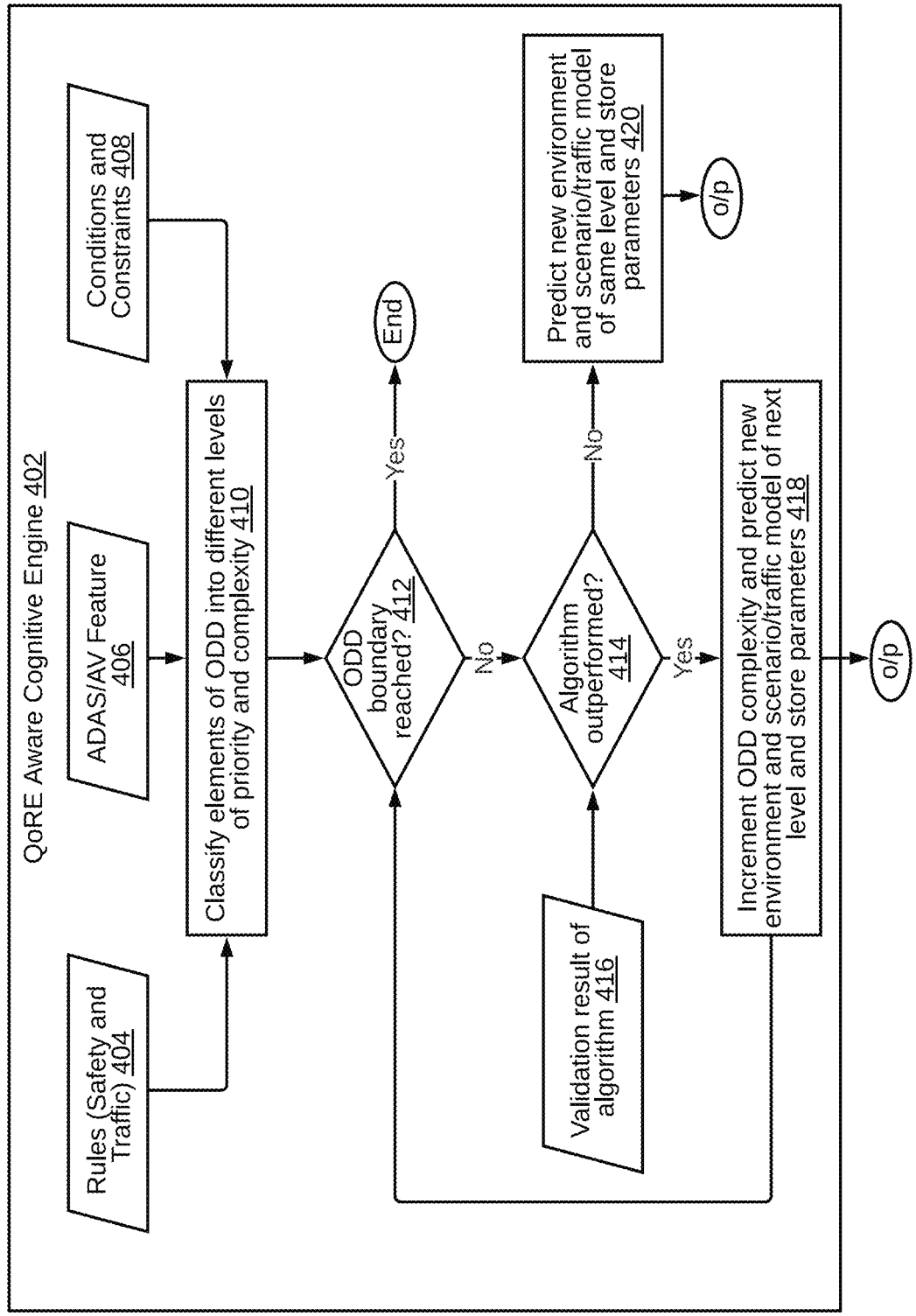
FIG. 4 illustrates a flow diagram of an exemplary control logic for managing the level of complexity of a driving scenario, in accordance with some embodiments.

Referring now to FIG. 4, an exemplary control logic 400 for managing level of complexity of a driving scenario is depicted via a flowchart, in accordance with some embodiments. The control logic 400 may be implemented by a QoRE-aware cognitive engine 402. It may be noted that the QoRE-aware cognitive engine 402 may be analogous to the QoRE-aware cognitive engine 202 of the ADAS and AV testing device 200. The QoRE-aware cognitive engine 402 may receive rules (safety and traffic) 404, ADAS/AV feature 406, and conditions and constraints 408 as inputs for determining the level of complexity of the driving scenario. Each of the inputs may be used to define an ODD boundary for the level of complexity of the driving scenario. At step 410, elements of ODD may be classified into different levels of priority and complexity based on the inputs received. At step 412, a check is performed to determine whether the ODD boundary is reached. If the ODD boundary is reached, the process 400 is terminated. If the ODD boundary is not reached, a check is performed at step 414 to determine whether algorithm of the AV stack is outperformed based on a validation result of the algorithm 416. If the algorithm of the AV stack is outperformed, the level of complexity of the ODD is incremented, a new environment and scenario/traffic model of next level of complexity is predicted, and parameters are stored, at step 418. If the algorithm of the AV stack is not outperformed a new environment and scenario/traffic model of same level and store parameters may be predicted, at step 420. Upon completion of step 418, a feedback loop is created with the step 412 until the ODD boundary is reached. Each of the step 418 and the step 420 give a simulated O/P. The simulated O/P may be used for further testing.

Figure 5:
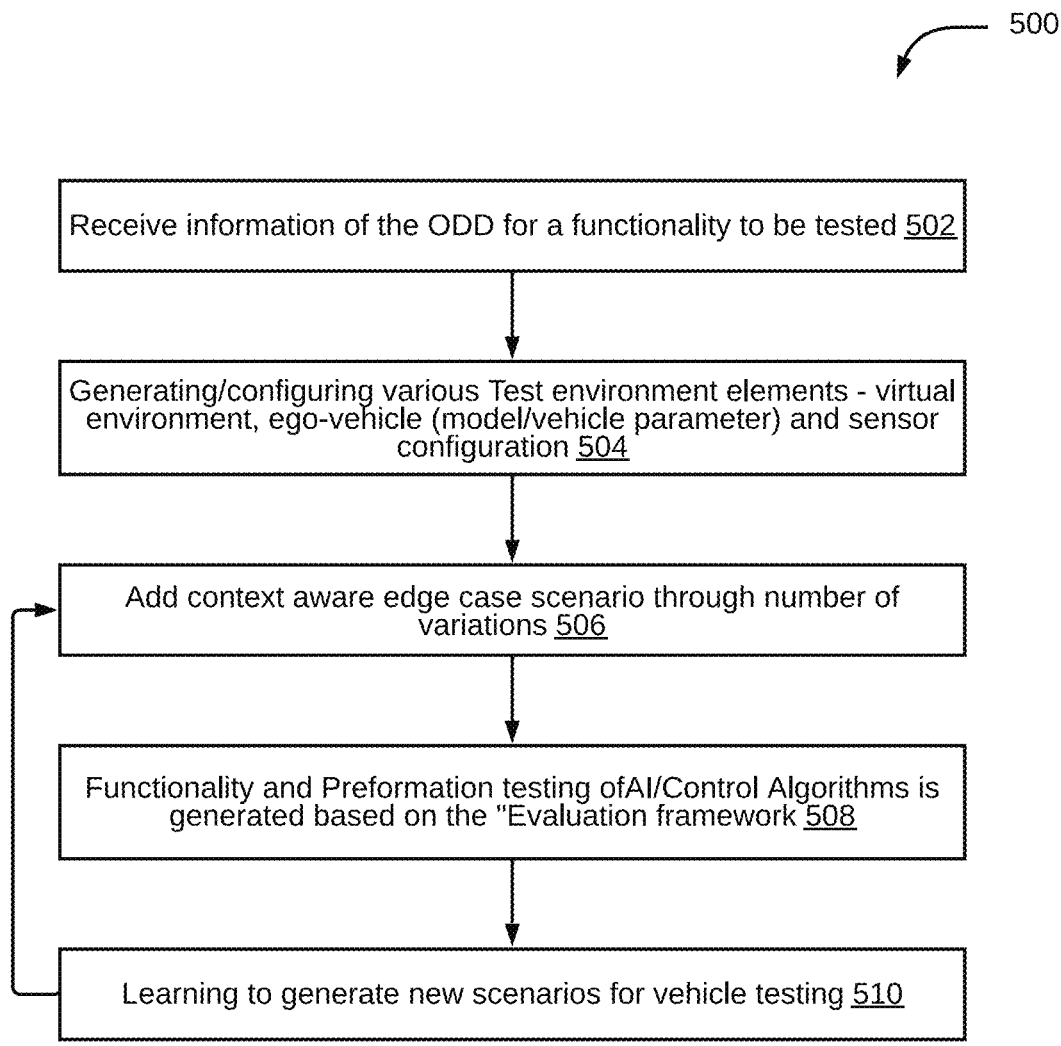
FIG. 5 is a flow diagram of a detailed exemplary process for validating an AV stack, in accordance with some embodiments.

Referring now to FIG. 5, a detailed exemplary process 500 for validating an AV stack is depicted via a flowchart, in accordance with some embodiments. The process 500 may be implemented by the ADAS and AV testing device 102 of the system 100. The process 500 includes, receiving information of the ODD for a functionality to be tested, at step 502. A manufacturer may describe an ODD and a potential range and boundaries within which at least one feature of the ADAS/AV stack 208 may be designed to function. By way of an example, an ODD may include road types, physical infrastructure, geographic area, lighting/weather conditions, speed range, and other operations constraints. The process 500 further includes, generating or configuring various test environment elements (for example, virtual environment, ego-vehicle (model/vehicle parameters), and sensor configuration), at step 504. A test environment is created by the QoRE-aware cognitive engine 202. The test environment may be created as a custom environment (such as, a geographic area), through the local and global knowledge base 218, either manually or automatically by importing Map data (such as, HD/OSM/Open Drive) or using real world sensor data 220. Alternately, the test environment may be created by configuring the ego vehicle and a sensors package corresponding to the ego vehicle using distributed dynamic action system 212, vehicle dynamics model, cognitive collective intelligent system 206, and the plurality of sensor models.

The process 500 further includes, adding context-aware edge-case scenarios through a number of variations, at step 506. The QoRE-aware cognitive engine 202 may determine a driving scenario and boundary conditions through a set of ODD characteristics. Further, QoRE-aware cognitive engine 202 may define various test case uses for validation of the at least one feature of the ADAS/AV stack 208. In an embodiment, based on the least one feature to be tested and a range of operation of the at least one feature, driving scenarios may be defined by a user and provided as an input to the automatic dynamic scenario generation system 204 for generation of the driving scenario. It may be noted that for each subsequent iteration, the level of complexity of the driving scenario increases until the boundary conditions are reached. The QoRE-aware cognitive engine 202 undergoes continuous learning to generate new driving scenarios for validating the ADAS/AV stack 208.

The process 500 further includes, generating functionality and preformation testing of AV stack based on the evaluation framework, at step 508. The QoRE-aware cognitive engine 202 may perform functionality and performance testing of the at least one feature of the ADAS/AV stack 208. The ADAS/AV stack 208 is evaluated based on an evaluation framework. When the test environment is ready, the ADAS/AV stack 208 may be plugged into the ADAS and AV testing device 200 for validation. Performance of the ADAS/AV stack 208 may be evaluated using QoRE evaluation system 210 by referencing against information received from the cognitive collective intelligent system 206 in real-time. Performance of the ADAS/AV stack 208 may be analyzed and a detailed report may be generated showing performance at multiple stages. It may be noted that the analyzed performance may be in form of a real-time visualization and may be recorded and replayed at convenience. The process 500 further includes, learning to generate new scenarios for ego vehicle testing, at step 510. The QoRE-aware cognitive engine 202 is configured to learn to generate new scenarios for ADAS/AV stack 208 testing. End o/p of the ADAS/AV stack 208 may be provided as an input for scenario generation in next iteration along with other parameters for learning and improvement of algorithm.

Figure 6:
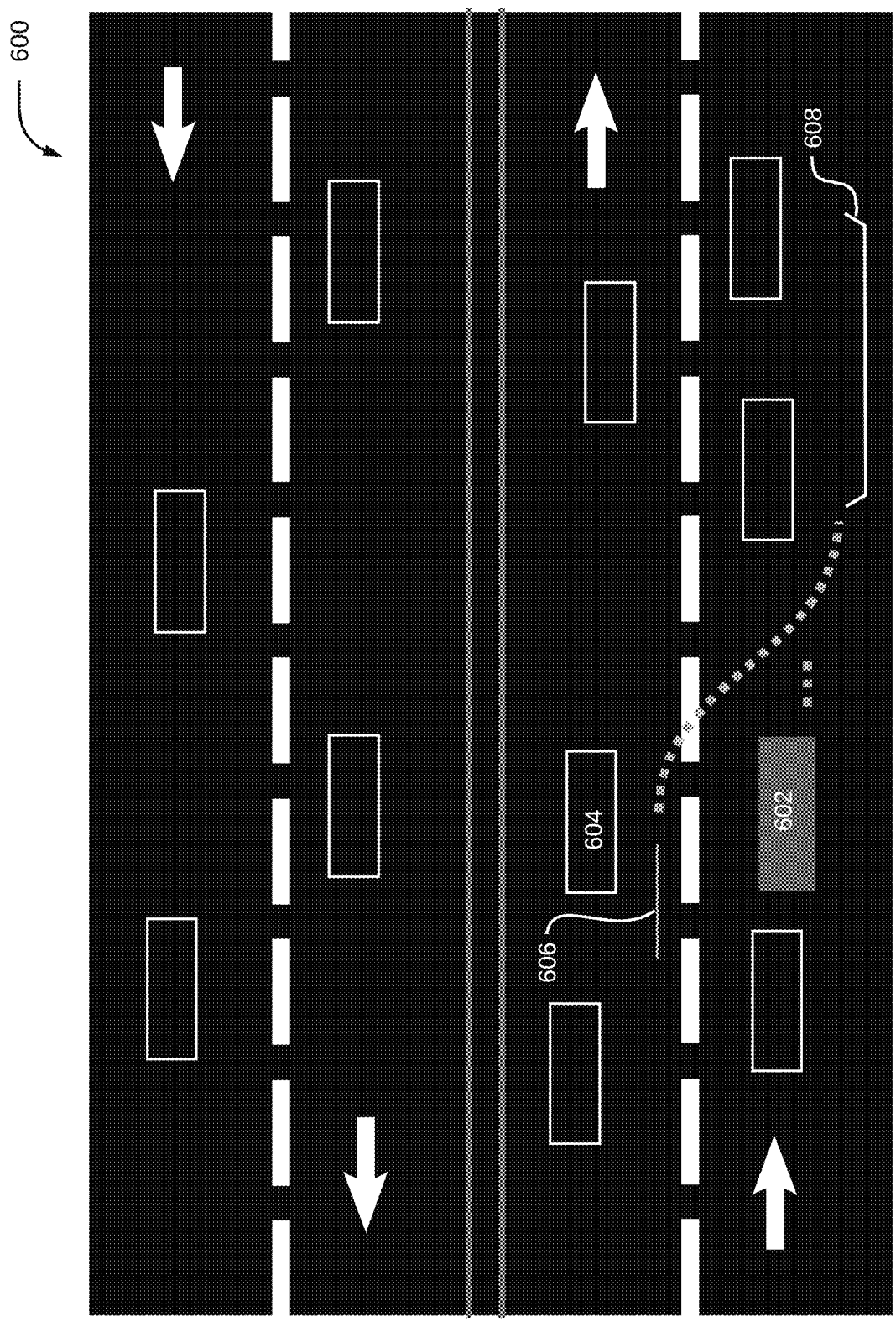
FIG. 6 illustrates an exemplary driving scenario of an ego vehicle in poor weather, in accordance with some embodiments.

Referring now to FIG. 6, an exemplary driving scenario 600 of an ego vehicle 602 in a poor weather is illustrated, in accordance with some embodiments. The driving scenario 600 includes an ego vehicle 602, a plurality of non-ego vehicles (such as a non-ego vehicle 604), a non-ego two-wheeler vehicle 606, and a bus stop 608. In the driving scenario 600, in poor weather (for example, rainy weather), more 4-wheeled vehicles are seen on road, mostly driving slow due to reduced visibility. A number of 2-wheeled vehicles (for example, bike) is less and aggressive driving may be seen to reach a safe place (such as, the bus stop 608) quickly. High speed may lead to bike slipping due to reduced road traction.

Figure 7:
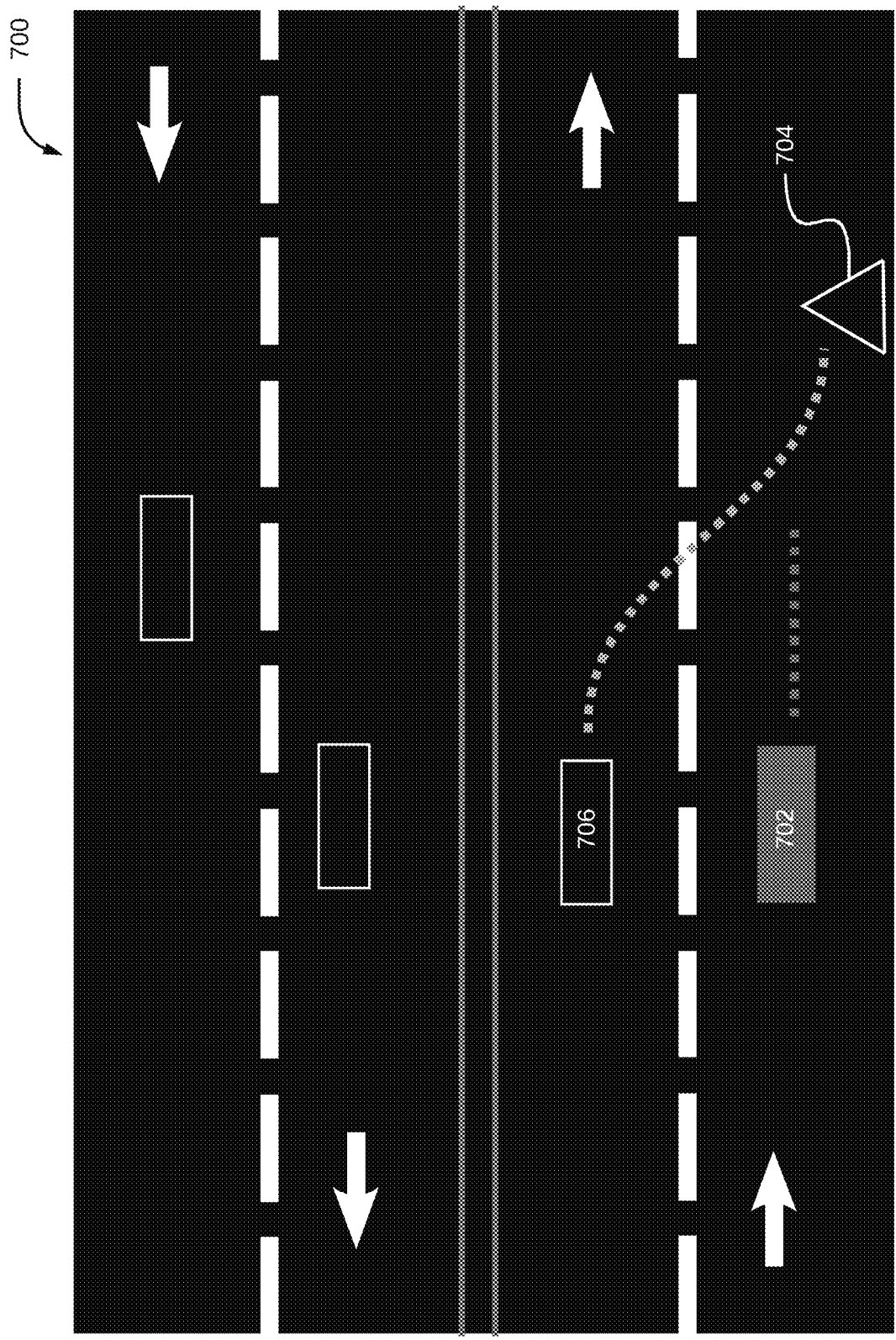
FIG. 7 illustrates an exemplary driving scenario of an ego vehicle to identify gestures by a pedestrian on the roadside, in accordance with some embodiments.

Referring now to FIG. 7, an exemplary driving scenario 700 of an ego vehicle 702 to identify gestures by a pedestrian 704 on roadside is illustrated, in accordance with some embodiments. The driving scenario 700 includes an ego vehicle 702, a plurality of non-ego vehicles (such as a non-ego vehicle 706), and a pedestrian 704. In the driving scenario 700, the pedestrian 704 may use a hand-gesture to call a taxi (for example, the non-ego vehicle 706) or any other vehicle for a lift towards the pedestrian 704. The ego vehicle 702 may determine an overall context of the hand-gesture for stopping the non-ego vehicle 706 and predict a trajectory of the non-ego vehicle 706 towards the pedestrian 704 cutting-in the ego vehicle 702 from left. The ego vehicle 702 may slowdown to allow the non-ego vehicle 706 to cut-in.

Figure 8:
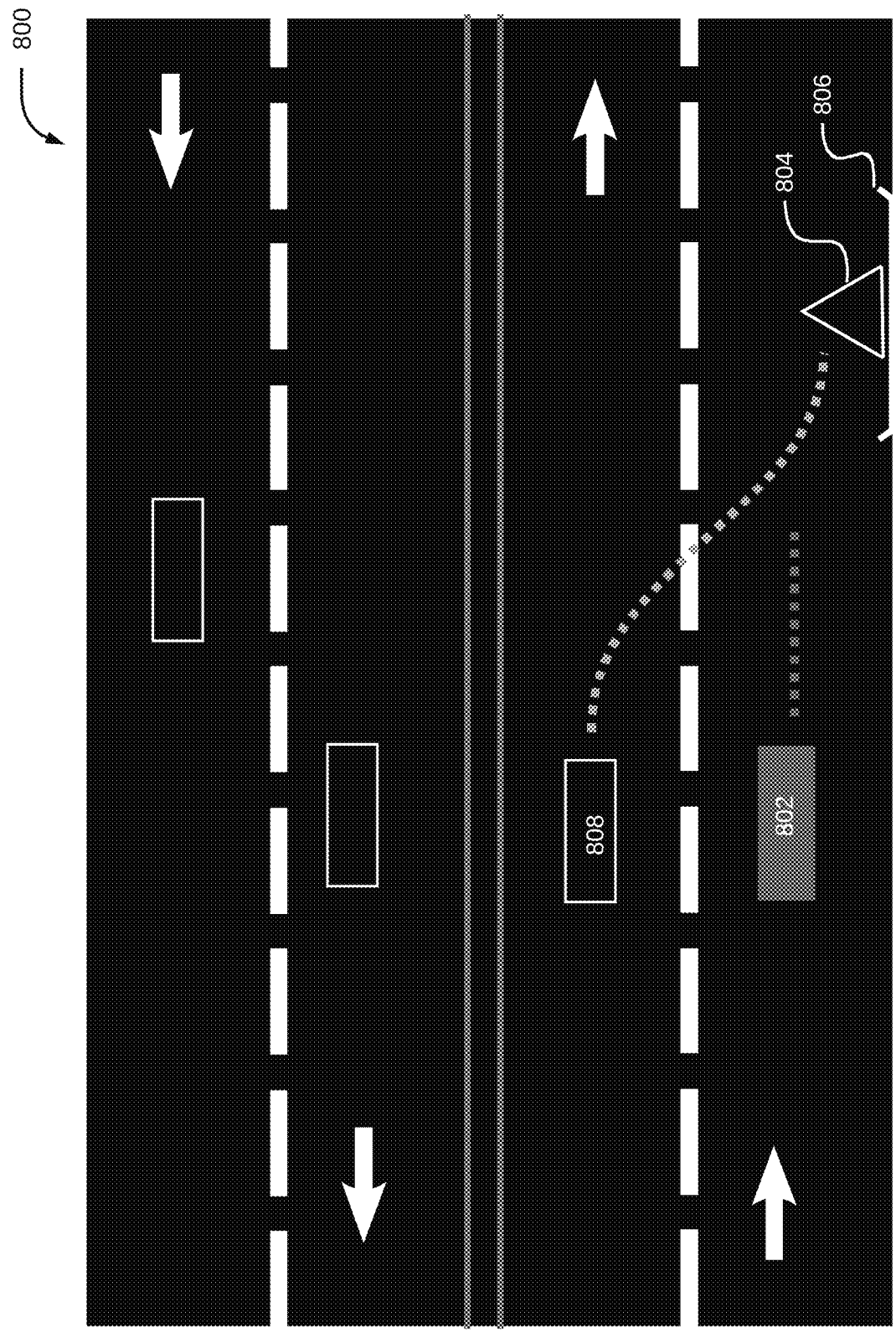
FIG. 8 illustrates an exemplary driving scenario of an ego vehicle to identify gestures by a pedestrian at a bus stop, in accordance with some embodiments.

Referring now to FIG. 8, an exemplary driving scenario 800 of an ego vehicle 802 to identify gestures by a pedestrian 804 at a bus stop 806 is illustrated, in accordance with some embodiments. The driving scenario may include the ego vehicle 802, the pedestrian, the bus stop 806, and a bus 808. In the driving scenario 800, the pedestrian 804 may use a hand-gesture to call the bus 808 towards the bus stop 806. The ego vehicle 802 may identify the approaching the bus stop 806 and identify the hand-gesture for stopping the bus 808. The ego vehicle 802 may identify a trajectory of the bus 808 towards the pedestrian 804 cutting-in the ego vehicle 802 from left. It should be noted that the bus 808 may not stop but the ego vehicle 802 should be cautious. The ego vehicle 802 may slow down to allow the bus 808 to cut-in.

Figure 9:
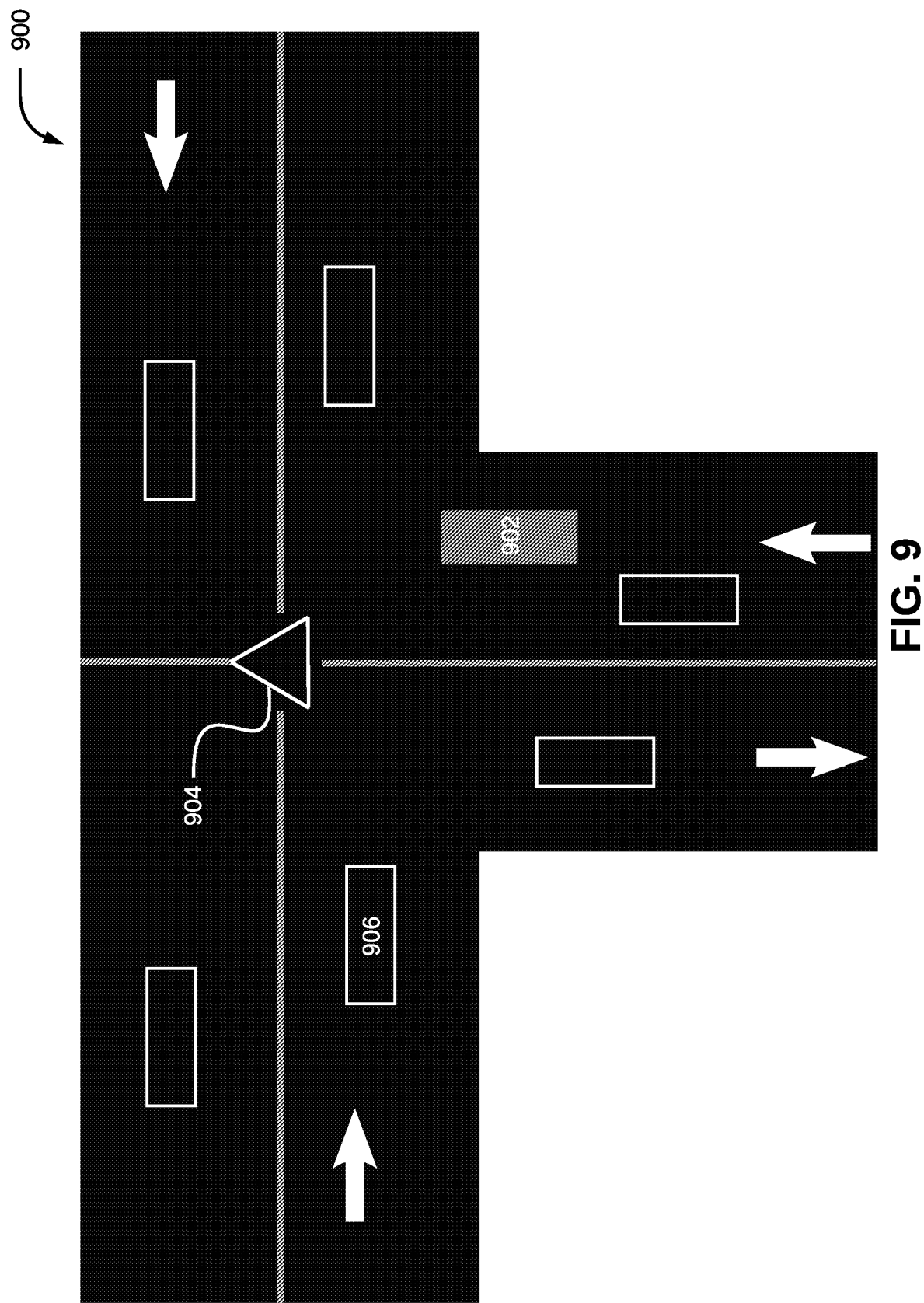
FIG. 9 illustrates an exemplary driving scenario of an ego vehicle at a junction to identify gestures by a traffic manager, in accordance with some embodiments.

Referring now to FIG. 9, an exemplary driving scenario 900 of an ego vehicle 902 at a junction to identify gestures by a traffic manager 904 is illustrated, in accordance with some embodiments. The driving scenario 900 may include an ego vehicle 902, a traffic manager 904, and a non-ego vehicle 906. In the driving scenario 900, the ego vehicle 902 may recognize hand-gestures (for example, to stop or to move) used by the traffic manager 904 to manage the intersection. Further, the ego vehicle 902 may identify a trajectory of other vehicles and behavior of pedestrians to make a decision. It should be noted that the traffic manager 904 may be a traffic cop or a person trying to manage traffic using known gestures.

Figure 10:
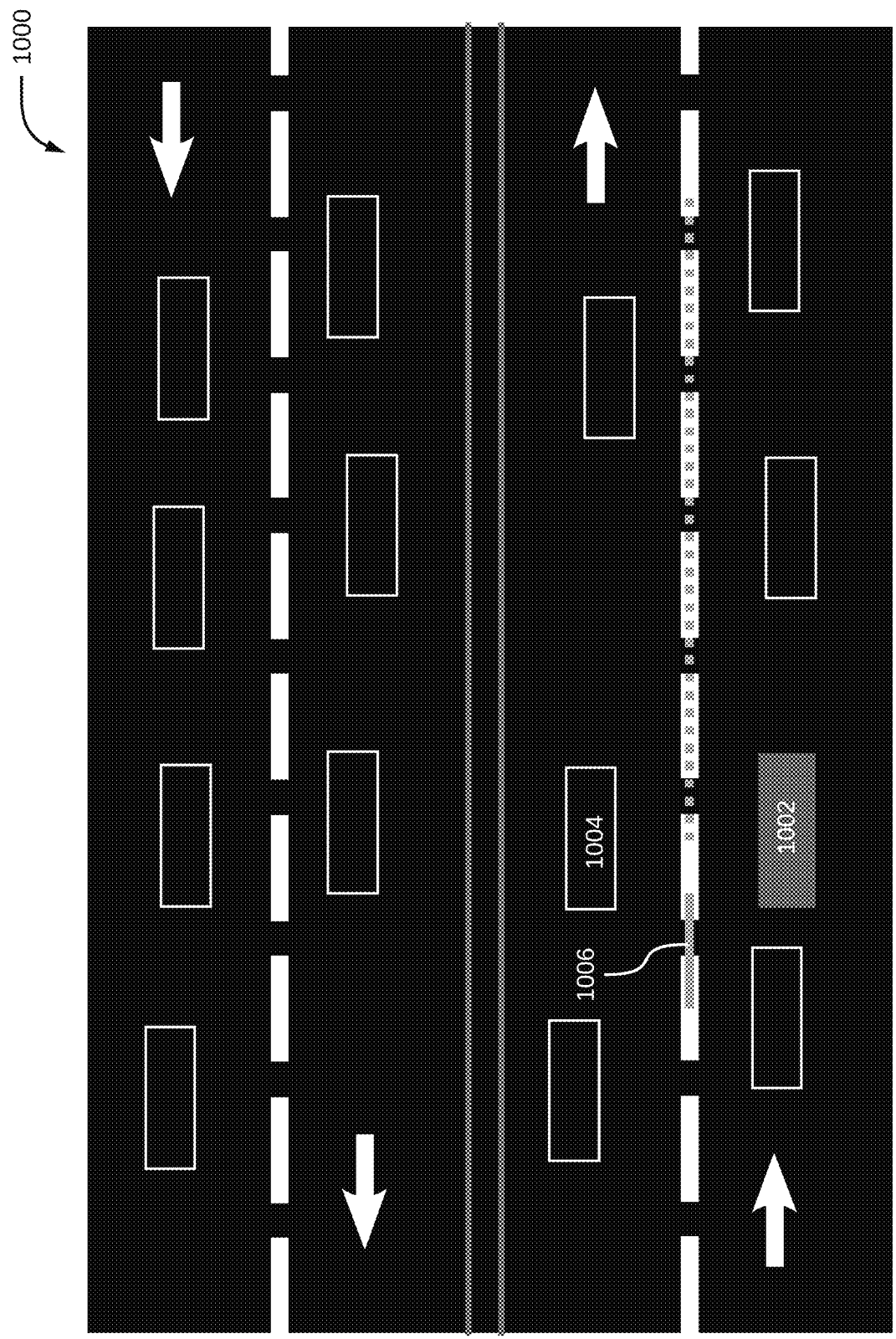
FIG. 10 illustrates an exemplary driving scenario of an ego vehicle on a road with heavy traffic, in accordance with some embodiments.

Referring now to FIG. 10, an exemplary driving scenario 1000 of an ego vehicle 1002 on a road with heavy traffic is illustrated, in accordance with some embodiments. The driving scenario 1000 may include an ego vehicle 1002, a non-ego vehicle 1004, and a 2-wheeled vehicle 1006. During morning or evening at office hours, traffic is heavy. It may be noted that during heavy traffic, driving for non-ego vehicle 1004 may be conservative and moderate due to bumper to bumper traffic. It may also be noted that driving for 2-wheeled vehicle 1006 may be above an average speed of traffic due to lane-splitting. The ego vehicle 1002 may identify such patterns and act accordingly.

Figure 11:
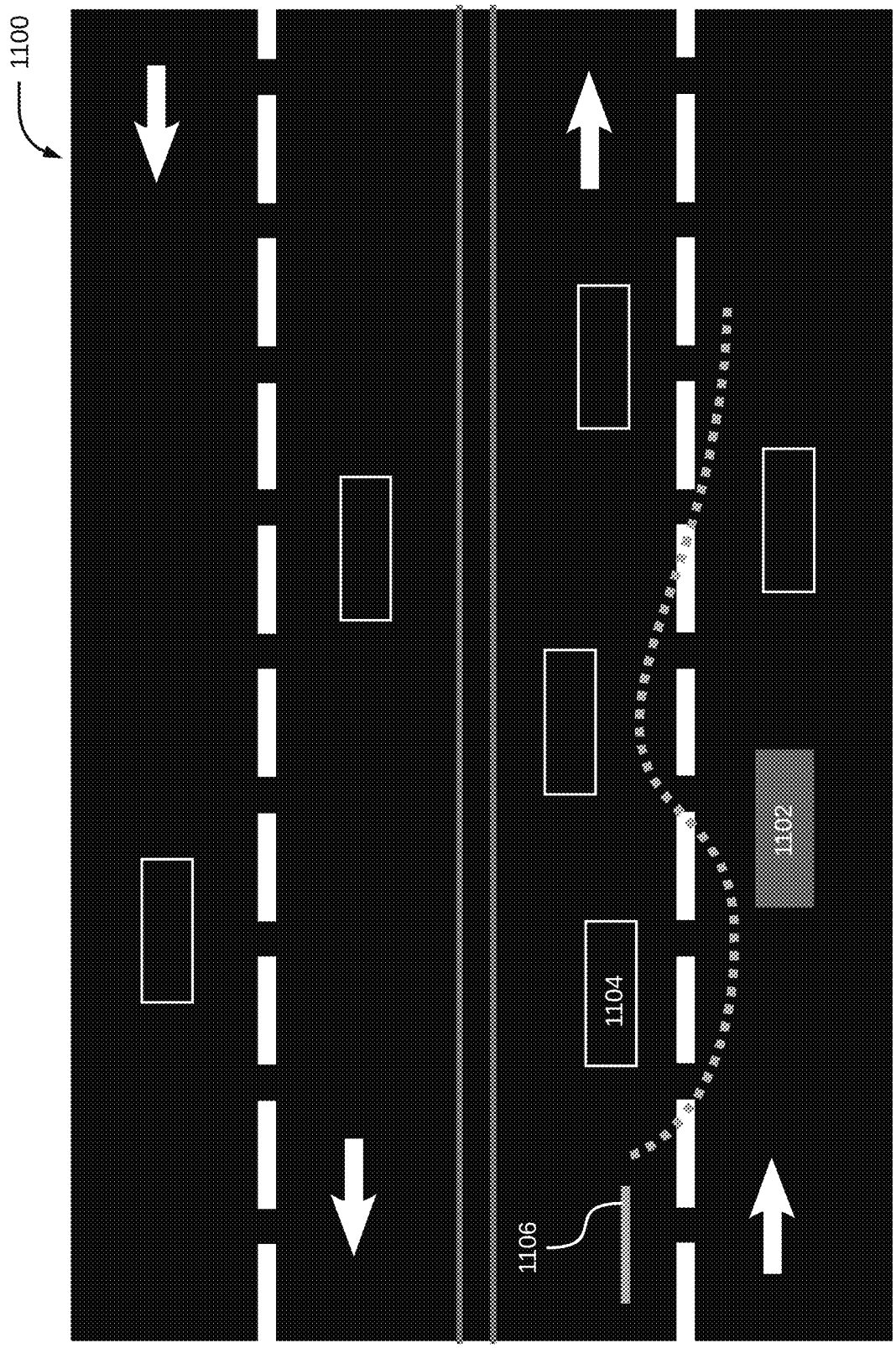
FIG. 11 illustrates an exemplary driving scenario of an ego vehicle on a road with light traffic, in accordance with some embodiments.

Referring now to FIG. 11, an exemplary driving scenario 1100 of an ego vehicle 1102 on a road with light traffic is illustrated, in accordance with some embodiments. The driving scenario 1100 may include an ego vehicle 1102, a non-ego vehicle 1104, and a 2-wheeled vehicle 1106. During light or moderate traffic, aggressive driving behavior is observed including fast acceleration, zigzag driving, or sudden braking by each of the non-ego vehicle 1104 and the 2-wheeled vehicle 1106. The ego vehicle 1102 may identify such patterns and act accordingly.

Figure 12:
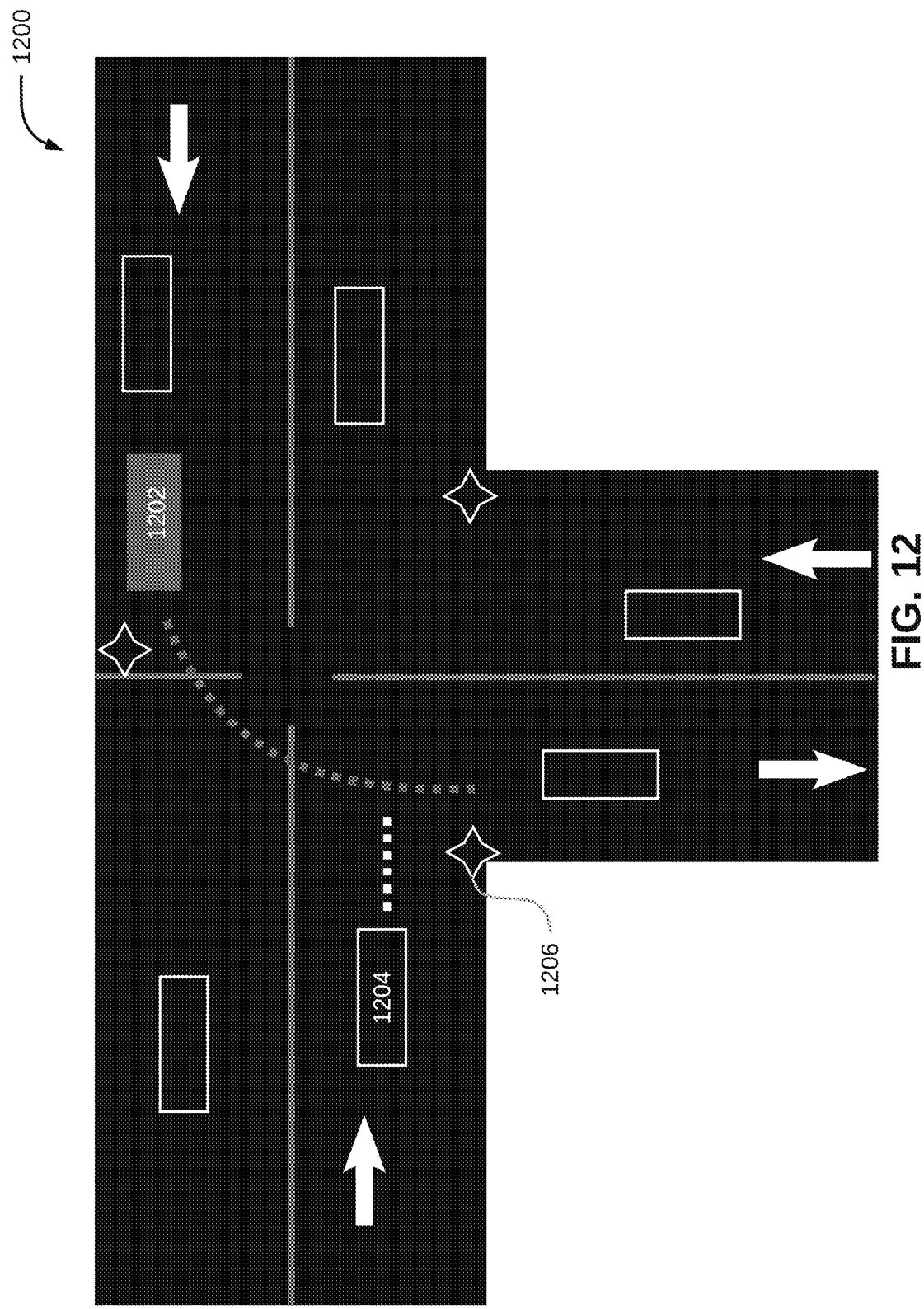
FIG. 12 illustrates an exemplary driving scenario of an ego vehicle at a junction with light traffic, in accordance with some embodiments.

Referring now to FIG. 12, an exemplary driving scenario 1200 of an ego vehicle 1202 at a junction with light traffic is illustrated, in accordance with some embodiments. The driving scenario 1200 includes the ego vehicle 1202, a non-ego vehicle 1204, and a plurality of traffic lights (for example, the traffic light 1206). In the driving scenario 1200, the non-ego vehicle 1204 may be at a high speed to cross the traffic light 1206 (coming straight) and the ego vehicle 102 may be taking a left turn. Alternately, a 2-wheeled vehicle (not shown in figure) may be coming straight at a high speed when the ego vehicle 1202 is taking the left turn. The ego vehicle 1202 may identify such patterns and act accordingly.

Figure 13:
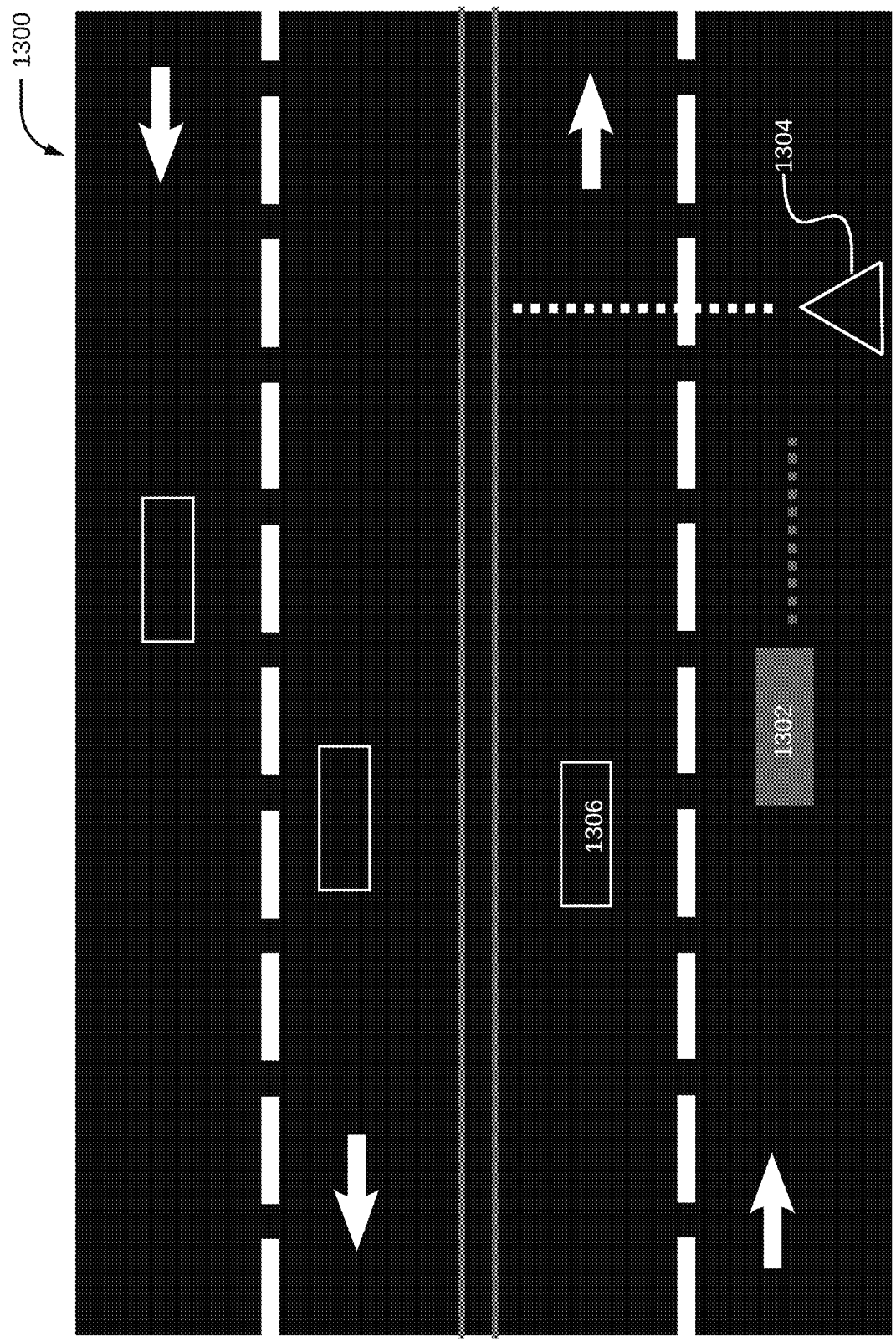
FIG. 13 illustrates an exemplary driving scenario of an ego vehicle to identify an action by a pedestrian, in accordance with some embodiments.

Referring now to FIG. 13, exemplary driving scenario 1300 of an ego vehicle 1302 to identify an action by a pedestrian 1304 is illustrated, in accordance with some embodiments. The driving scenario 1300 includes the ego vehicle 1302, the pedestrian 1304, and a non-ego vehicle 1306. In the driving scenario 1300, the pedestrian 1304 may be jay-walking, suddenly crossing the road, or crossing the road without paying attention. Alternately, the pedestrian 1304 may be blocked from vision of the ego vehicle 1302 by the non-ego vehicle 1306 (for example, when the pedestrian 1304 is standing and crossing the road from other side). The ego vehicle 1302 may identify such patterns and act accordingly.

Some other driving scenarios may include, but may not be limited to lane narrowing due to construction or vehicle breakdown, different parking styles (for example, parallel, diagonal, perpendicular, etc.) with dynamically changing occupied or empty slots, random traffic not following rules (for example, jumping signals, driving in wrong lane, showcasing of aggressive driving behavior (through overtaking and not following lane) or zig-zag traffic (following no lane rule) due to unstructured or damaged road), highway autopilot, joining and leaving traffic, and the like.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 14:
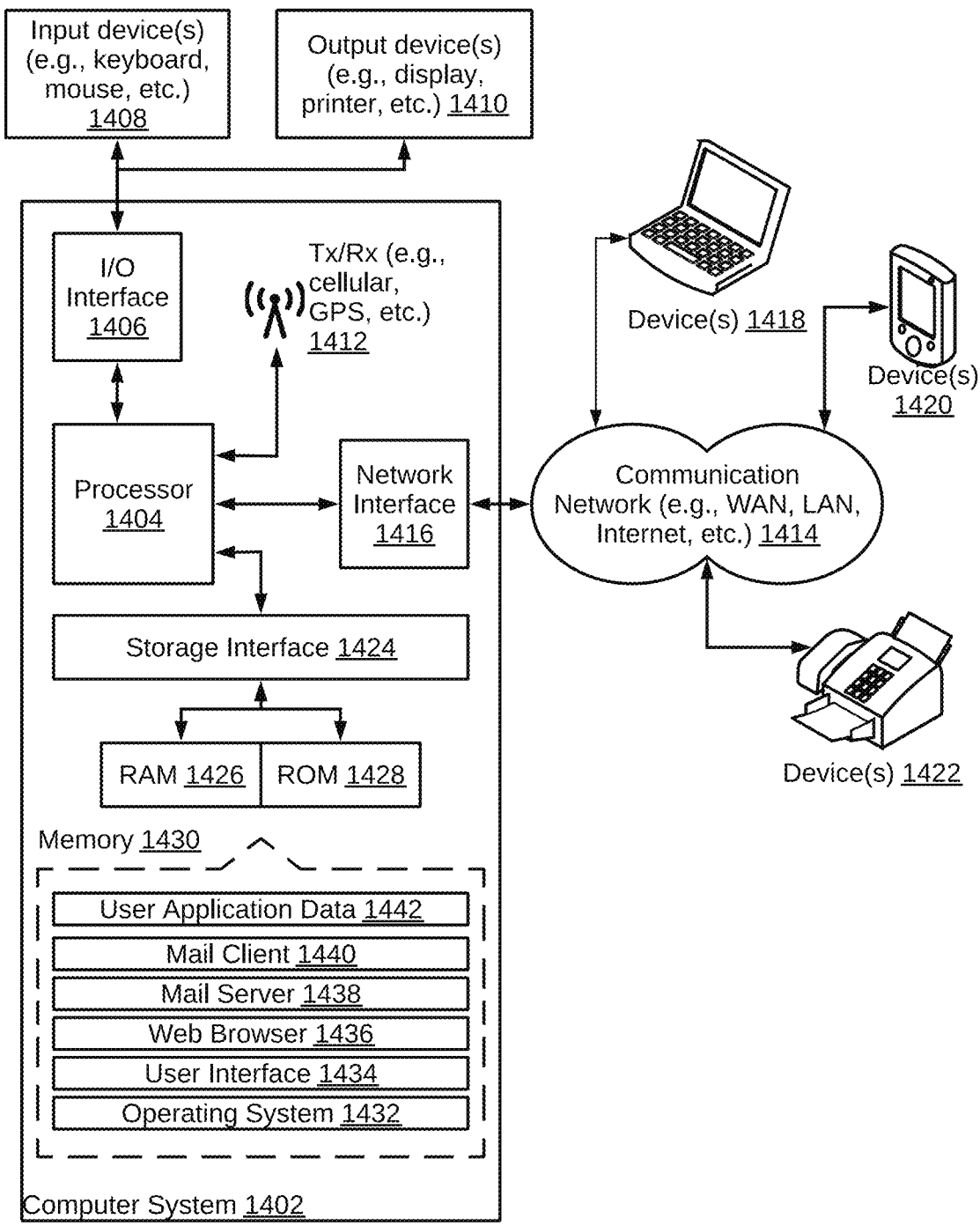
FIG. 14 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 14, a block diagram of an exemplary computer system 1402 for implementing embodiments consistent with the present disclosure is illustrated. Variations of computer system 1402 may be used for implementing system 100 for building an ensemble model. Computer system 1402 may include a central processing unit ("CPU" or "processor") 1404. Processor 1404 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 1404 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1404 may be disposed in communication with one or more input/output (I/O) devices via I/O interface 1406. The I/O interface 1406 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 1406, the computer system 1402 may communicate with one or more I/O devices. For example, the input device 1408 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 1410 may be a printer, fax machine, video display (e.g., cathode ray tube (CRT), liquid crystal display (LCD), light-emitting diode (LED), plasma, or the like), audio speaker, etc. In some embodiments, a transceiver 1412 may be disposed in connection with the processor 1404. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM45501UB8®, INFINEON TECHNOLOGIES® X-GOLD 1436-PMB9800® transceiver, or the like), providing IEEE 802.11a/b/g/n, Bluetooth, FM, global positioning system (GPS), 2G/3G HSDPA/HSUPA communications, etc.

In some embodiments, the processor 1404 may be disposed in communication with a communication network 1416 via a network interface 1414. The network interface 1414 may communicate with the communication network

1416. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1416 may include, without limitation, a direct interconnection, local area network (LAN), wide area network (WAN), wireless network (e.g., using Wireless Application Protocol), the Internet, etc. Using the network interface 1414 and the communication network 1416, the computer system 1402 may communicate with devices 1418, 1420, and 1422. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 1402 may itself embody one or more of these devices.

In some embodiments, the processor 1404 may be disposed in communication with one or more memory devices 1430 (e.g., RAM 1426, ROM 1428, etc.) via a storage interface 1424. The storage interface may connect to memory devices 1430 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 1430 may store a collection of program or database components, including, without limitation, an operating system 1432, user interface application 1434, web browser 1436, mail server 1438, mail client 1440, user/application data 1442 (e.g., any data variables or data records discussed in this disclosure), etc. The operating system 1432 may facilitate resource management and operation of the computer system 1402. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 1434 may facilitate display, execution, interaction, manipulation, or operation of program components through textual or graphical facilities. For example, user interfaces may provide computer interaction interface elements on a display system operatively connected to the computer system 1402, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 1402 may implement a web browser 1436 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 1402 may implement a mail server 1438 stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 1402 may implement a mail client 1440 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 1402 may store user/application data 1442, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

Thus, the disclosed method and system try to overcome the technical problem of validating an AV stack. The method and system generate realistic driving scenarios based on real-world data such as, but not limited to, sensor data, map data, satellite data, scenario data, traffic rules data, and the like. The method and system train the AV stack using challenging scenarios which may be rarely encountered in real-world scenarios to enhance driving capability of the AV stack under life-threatening circumstances. The method and system provide a self-learning model for generating driving scenarios for training and validating performance of the AV stack.

Specifically, the claimed limitations of the present disclosure address the technical challenge by receiving an ODD and real-world data for simulating at least one of an ADAS and the AV, generating a driving scenario based on the ODD of the AV and the real-world data through a QoRE-aware cognitive engine, evaluating at least one of the ADAS and the AV based on the driving scenario, and determining a set of performance metrics corresponding to the at least one feature of at least one of the ADAS and the AV in the driving scenario based on the simulating.

As will be appreciated by those skilled in the art, the techniques described in the various embodiments discussed above are not routine, or conventional, or well understood in the art. The techniques discussed above provide for validating an AV stack. The techniques first receive an ODD and real-world data. The techniques may then employ a QoRE-aware cognitive engine to determine a driving scenario based on the ODD and real-world data. The techniques may then evaluate the AV stack in the driving scenario. The techniques may then determine a set of performance metrics based on the simulation. The set of performance metrics after each iteration may be used to fine-tune the AV stack. Further, the techniques provide for visualization of the AV in the driving scenario.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for validating an AV stack. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for validating an Autonomous Vehicle (AV) stack, the method comprising:
   receiving, by an ADAS and AV testing device, an Operational Design Domain (ODD) and real-world data for simulating at least one of an Advanced Driver Assistance System (ADAS) and the AV, wherein the ODD is based on at least one feature of the at least one of the ADAS and the AV;
   for each of a plurality of iterations,
      generating, by the ADAS and AV testing device, a driving scenario based on the ODD of the AV and the real-world data through a Quality of Ride Experience (QoRE)-aware cognitive engine, wherein the driving scenario comprises a level of complexity;
      simulating, by the ADAS and AV testing device, the at least one of the ADAS and the AV based on the driving scenario; and
      determining, by the ADAS and AV testing device, a set of performance metrics corresponding to the at least one feature of the at least one of the ADAS and the AV in the driving scenario based on the simulating; and
   increasing the level of complexity of the driving scenario, by the ADAS and AV testing device, if the set of performance metrics corresponding to the at least one feature of the at least one of the ADAS and the AV is above a predefined threshold within a predefined number of iterations, wherein the increasing is based on one or more of the at least one feature of the at least one of the ADAS and the AV, the map location selected for the AV, the set of traffic rules corresponding to the map location, the AV, a configuration of a plurality of sensors coupled to the AV, previous driving scenarios, and the set of performance metrics for the previous driving scenarios.

2. The method of claim 1, further comprising:
   maintaining the level of complexity of the driving scenario if the set of performance metrics corresponding to the at least one feature of the at least one of the ADAS and the AV is below a predefined threshold within a predefined number of iterations.

3. The method of claim 2, further comprising generating an evaluation report comprising the set of performance metrics corresponding to the at least one feature of the at least one of the ADAS and the AV after the predefined number of iterations.

4. The method of claim 1, further comprising:
   determining a set of sequential tasks to be performed by the at least one of the ADAS and the AV based on the simulating; and
   visualizing a dynamic model of each of a plurality of AVs and an environment in the driving scenario through reverse actuation based on the set of sequential tasks, wherein the AV is one of the plurality of AVs.

5. The method of claim 4, wherein the dynamic model of each of the plurality of AVs comprises a vehicle dynamics model for each of an AV body, an AV drivetrain engine, an AV drivetrain transmission, an AV suspension model, and an AV tire model.

6. The method of claim 1, further comprising, at least one of:
   generating virtual environment data based on the real-world data received from a plurality of interconnected AVs in real-time; and
   generating virtual environment data based on a plurality of objects selected from an asset repository by a user.

7. The method of claim 6, wherein the virtual environment data comprises a plurality of layers, and wherein the plurality of layers comprises one or more of a surface information layer, a static objects information layer, a dynamic environmental information layer, and an acoustic information layer.

8. The method of claim 7, wherein the dynamic environmental information layer comprises traffic data based on a plurality of AVs, and wherein the traffic data comprises density, driver dynamics, and vehicle dynamics corresponding to each of the plurality of AVs.

9. The method of claim 1, wherein the set of performance metrics comprises distance metrics, speed metrics, AV accident metrics, perception metrics, driving quality metrics, and ride quality metrics.

10. A system for validating an Autonomous Vehicle (AV) stack, the system comprising:
  a processor; and
  a computer-readable medium communicatively coupled to the processor, wherein the computer-readable medium stores processor-executable instructions, which when executed by the processor, cause the processor to:
    receive an Operational Design Domain (ODD) and real-world data for simulating at least one of an Advanced Driver Assistance System (ADAS) and the AV, wherein the ODD is based on at least one feature of the at least one of the ADAS and the AV;
    for each of a plurality of iterations,
      generate a driving scenario based on the ODD of the AV and the real-world data through a Quality of Ride Experience (QoRE)-aware cognitive engine, wherein the driving scenario comprises a level of complexity;
      simulate the at least one of the ADAS and the AV based on the driving scenario; and
      determine a set of performance metrics corresponding to the at least one feature of the at least one of the ADAS and the AV in the driving scenario based on the simulating; and
    increase the level of complexity of the driving scenario, if the set of performance metrics corresponding to the at least one feature of the at least one of the ADAS and the AV is above a predefined threshold within a predefined number of iterations, wherein the increasing is based on one or more of the at least one feature of the at least one of the ADAS and the AV, the map location selected for the AV, the set of traffic rules corresponding to the map location, the AV, a configuration of a plurality of sensors coupled to the AV, previous driving scenarios, and the set of performance metrics for the previous driving scenarios.

11. The system of claim 10, wherein, the processor-executable instructions, on execution, further cause the processor to
  maintain the level of complexity of the driving scenario if the set of performance metrics corresponding to the at least one feature of the at least one of the ADAS and the AV is below a predefined threshold within a predefined number of iterations.

12. The system of claim 11, wherein, the processor-executable instructions, on execution, further cause the processor to generate an evaluation report comprising the set of performance metrics corresponding to the at least one feature of the at least one of the ADAS and the AV after the predefined number of iterations.

13. The system of claim 10, wherein, the processor-executable instructions, on execution, further cause the processor to:
    determine a set of sequential tasks to be performed by the at least one of the ADAS and the AV based on the simulating; and
    visualize a dynamic model of each of a plurality of AVs and an environment in the driving scenario through reverse actuation based on the set of sequential tasks, wherein the AV is one of the plurality of AVs.

14. The system of claim 13, wherein the dynamic model of each of the plurality of AVs comprises a vehicle dynamics model for each of an AV body, an AV drivetrain engine, an AV drivetrain transmission, an AV suspension model, and an AV tire model.

15. The system of claim 10, wherein, the processor-executable instructions, on execution, further cause the processor to, at least one of:
    generate virtual environment data based on the real-world data received from a plurality of interconnected AVs in real-time; and
    generate virtual environment data based on a plurality of objects selected from an asset repository by a user.

16. The system of claim 15, wherein the virtual environment data comprises a plurality of layers, and wherein the plurality of layers comprises one or more of a surface information layer, a static objects information layer, a dynamic environmental information layer, and an acoustic information layer.

17. The system of claim 16, wherein the dynamic environmental information layer comprises traffic data based on a plurality of AVs, and wherein the traffic data comprises density, driver dynamics, and vehicle dynamics corresponding to each of the plurality of AVs.

18. The system of claim 10, wherein the set of performance metrics comprises distance metrics, speed metrics, AV accident metrics, perception metrics, driving quality metrics, and ride quality metrics.

19. A non-transitory computer-readable medium storing computer-executable instructions for validating an Autonomous Vehicle (AV) stack, the computer-executable instructions configured for:
    receiving an Operational Design Domain (ODD) and real-world data for simulating at least one of an Advanced Driver Assistance System (ADAS) and the AV, wherein the ODD is based on at least one feature of the at least one of the ADAS and the AV;
    for each of a plurality of iterations,
      generating a driving scenario based on the ODD of the AV and the real-world data through a Quality of Ride Experience (QoRE)-aware cognitive engine, wherein the driving scenario comprises a level of complexity;
      simulating the at least one of the ADAS and the AV based on the driving scenario; and
      determining a set of performance metrics corresponding to the at least one feature of the at least one of the ADAS and the AV in the driving scenario based on the simulating; and
    increasing the level of complexity of the driving scenario, by the ADAS and AV testing device, if the set of performance metrics corresponding to the at least one feature of the at least one of the ADAS and the AV is above a predefined threshold within a predefined number of iterations, wherein the increasing is based on one or more of the at least one feature of the at least one of the ADAS and the AV, the map location selected for the AV, the set of traffic rules corresponding to the map location, the AV, a configuration of a plurality of sensors coupled to the AV, previous driving scenarios, and the set of performance metrics for the previous driving scenarios.

20. The non-transitory computer-readable medium of claim 19, wherein the computer-executable instructions are further configured for:

maintaining the level of complexity of the driving scenario if the set of performance metrics corresponding to the at least one feature of the at least one of the ADAS and the AV is below a predefined threshold within a predefined number of iterations.

* * * * *